Sept. 10, 1935.  V. A. BARY  2,014,160
LUBRICATED BEARING
Filed Jan. 12, 1933  4 Sheets-Sheet 1

Inventor:
Victor Alexander
Bary.

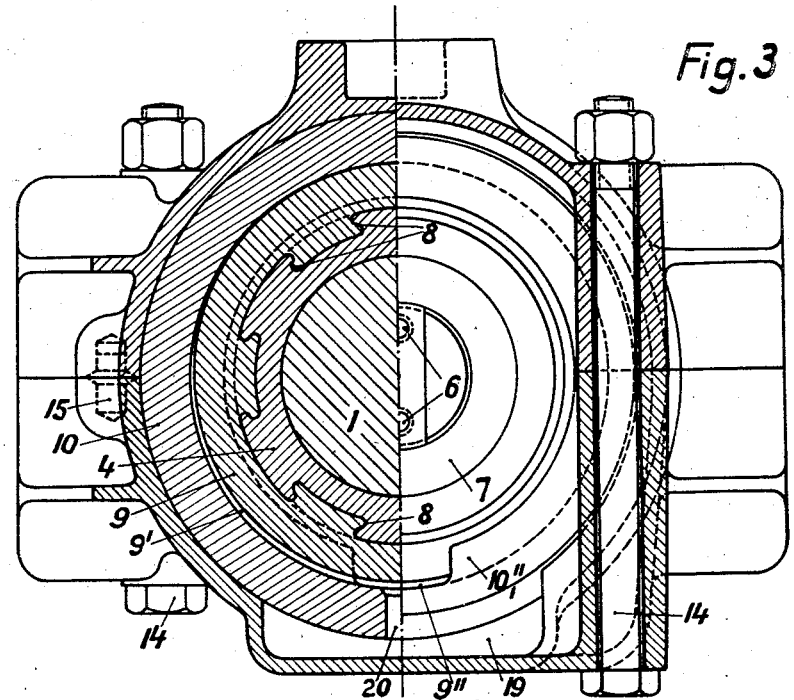
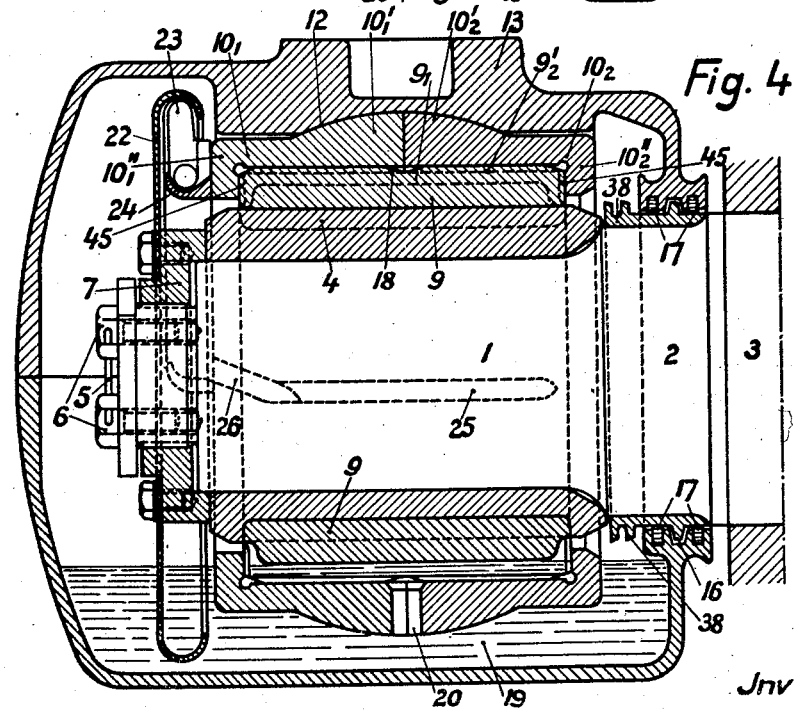

Sept. 10, 1935.   V. A. BARY   2,014,160

LUBRICATED BEARING

Filed Jan. 12, 1933   4 Sheets-Sheet 4

Inventor:
Victor Alexander
Bary.

Patented Sept. 10, 1935

2,014,160

UNITED STATES PATENT OFFICE 2,014,160

LUBRICATED BEARING

Victor Alexander Bary, London, S. W. 12, England

Application January 12, 1933, Serial No. 651,429
In Germany December 11, 1931

6 Claims. (Cl. 308—85)

The present invention proceeds from the knowledge that the quantity of lubricant taken along by the axle journal during a rotation of the axle journal and used for lubrication serves to a considerable extent for the transmission of the work of friction or frictional heat developed during a rotation of the axle journal. Owing to this frictional heat being taken up, the lubricant assumes high temperatures so that it becomes thinly liquid and is deprived of its lubricating capacity. If only a portion of the frictional heat is transmitted to the quantities of lubricant required for lubrication, the temperature stresses of the quantities of lubricant adapted for lubrication will be considerably decreased so that the lubricating capacity increases and the coefficients of friction are decreased. The developed work of friction or frictional heat is again decreased so that these effects increased progressively and produce a favorable sliding condition of the bearing. The axle bearing constructed according to the present invention for solving the problem in question is characterized by the distinctive feature that recesses extending substantially equidistant to each other are provided in the surface of the axle body in the longitudinal direction of the axle and are adapted to produce a number of bearing srufaces on the axle body. Each bearing surface slopes from a central highest vertex on the entire length of the axle body toward the neighbouring recesses in a peripheral direction so as to form, in connection with the bearing brass, wedge-shaped entrance spaces for each bearing surface in which lubricant is introduced by suitable means. Since two contiguous wedge-shaped recesses form a comparatively large collecting space for the lubricant, each of the wedge-shaped entrance spaces of the individual bearing surfaces receives lubricant from the storage space in front of the entrance space in the direction of rotation. Since each bearing surface takes up only a part of the load, each quantity of lubricant, provided for lubricating the bearing srufaces and stored in the storage spaces, receives only that portion of work of friction or frictional heat which is transmitted to the bearing surface to be lubricated during a rotation of the bearing. According to the number of bearing surfaces, the above portion constitutes a fraction of the developed work of friction or frictional heat so that the temperatures of the operating lubricant are reduced accordingly. The sliding capacity of the lubricant is increased to the same extent so that the desired sliding condition of the bearing according to the invention is attained.

The supply of the lubricant to the storage spaces formed by the wedge-shaped entrance spaces is of great importance. This supply must take place at unloaded places of the bearing brass so that the storage spaces can be filled with lubricant without difficulty. An immersion lubrication of the axle journal has proved to be very advantageour for the above purpose because the highest stressed point of an axle bearing lies in the upper vertex of the bearing brass; however, the lubricant storage receptacle is close to the lower vertex of the bearing brass, that is to say at an unloaded part thereof so that it is particularly adapted for effecting an immersion lubrication. In order that in this case the packing of the axle bearing will not present any difficulty, the axle journal is preferably reinforced by an annular member on the axle journal. This annular member has the requisite bearing surfaces. However, recesses may also be provided in the bearing brass on both sides of the axle journal so that the storage spaces of the axle body, which are formed between the individual bearing surfaces, may be filled with lubricant through the medium of the said recesses. Finally, recesses may be provided in the axle body itself, which communicate with the storage spaces between the individual bearing surfaces, so that in this manner the filling of the storage spaces with lubricant can be effected.

The drawings show embodiments of the invention by way of example. In said drawings:—

Fig. 3 shows an axle bearing with a bearing-member on a vertical view, partly in section, through the bearing, while Fig. 4 represents a form according to Fig. 1, again in vertical longitudinal section, with elevating of the lubricant and introduction of the raised lubricant by way of grooves in the supporting member.

Fig. 7 shows on the vertical transverse section through the bearing-member according to Fig. 6 the tangential arrangement of the channels, while

Figure 8:
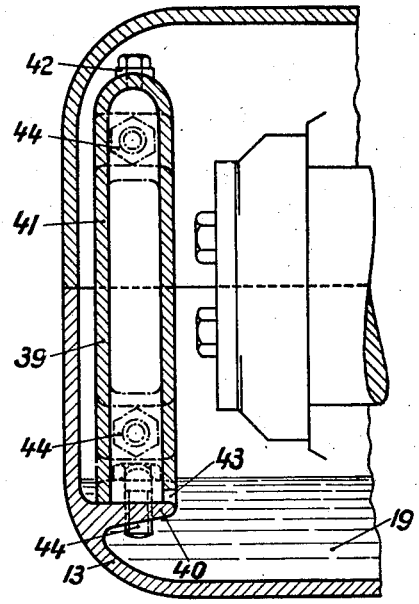

Fig. 8 finally shows the arrangement of the auxiliary lubricant store.

In all illustrations 1 indicates the axle journal, 3 the wheel nave and 2 the intermediate race. On the axle journal 1 there is shrunk the steel sleeve 4 which carries the bearing-member or bearing members. The axle journal collar 7 connected firmly by way of the bolts 6 with the axle journal 1 guards the sleeve 4 against axial displacements on the axle journal 1; the bolts 6 moreover are secured again in any desired manner at 5. To the sleeve 4, for example, by casting in, on or around it, there is firmly clamped or fixed the member 9 of anti-friction metal, which forms the bearing member or bearing members. Dove-tail recesses 8 in the sleeve 4 secure and receive clamping or fixing means which obviously may be replaced by any other ample securing device.

Figure 1:
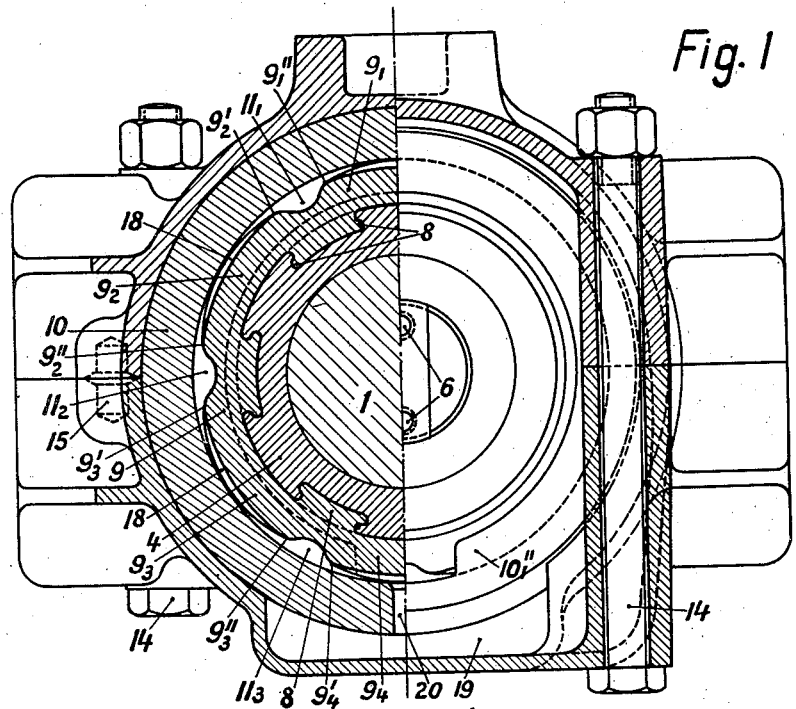
Fig. 1 represents a vertical view, partly in section, through the preferred form with several bearing-members.
Figure 2:
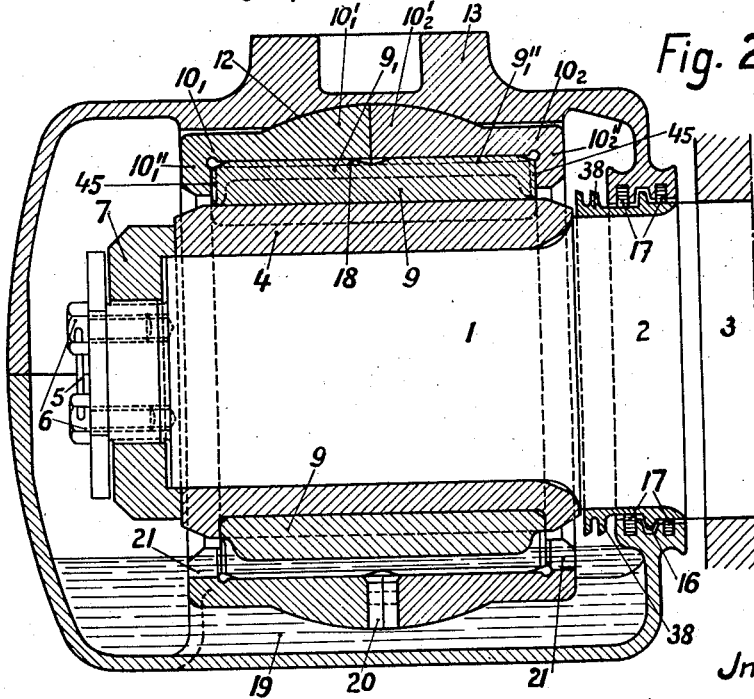
Fig. 2 represents a vertical longitudinal section through the axle bearing according to Fig. 1.

In the case of the preferred embodiment shown in Figs. 1 and 2 the anti-friction metal 9 forms a series of bearing members $9_1$, $9_2$, $9_3$ and so on, distributed regularly on the cylindrical bearing surface. Between all these bearing members and the supporting member 10 housing them, there are at each side of their places of contact, wedge-shaped entrance spaces $9_1''$, $9_2'$, $9_2''$, $9_3'$, $9_3''$, $9_4'$ and so on. By means of this arrangement there arise, between two wedge-shaped entrance spaces $9_1''$, and $9_2'$, $9_2''$ and $9_3'$, $9_3''$ and $9_4'$ and so on, storage spaces $11_1$, $11_2$, $11_3$ and so on.

The supporting member 10, which houses the so-formed bearing members $9_1$, $9_2$, $9_3$ and so on connected rigidly with one another, is divided at right angles to its longitudinal axis along a central plane. The two parts $10_1$ and $10_2$ possess, as can clearly be seen from Fig. 2, a rounded convex circumferential enlargement $10_1'$, $10_2'$, which is received in a corresponding concave recess 12 in the housing 13. By means of these convex enlargements $10_1'$, $10_2'$ and two halves $10_1$ and $10_2$ of the supporting member 10 are held together; moreover the supporting member 10 is guarded against shifting in this axial direction and is at the same time adjustable relatively to the axle bearing housing 13. The adjustability is of special value, because the axle journal under the influence of the load experiences a bending or sagging which is indeed slight but nevertheless is not without influence and which leads to unilateral stresses and wear if the journals and brasses that are not adjustable. In order to render possible the assembling of the supporting member 10, the axle housing 13, as can be seen from Fig. 1, is formed in two parts. It is held together by the bolts 14, fitting pins 15 guaranteeing the exact position of the housing halves relatively to one another. The supporting member 10 possesses moreover at its ends collar-like projections $10_1''$ and $10_2''$, which abut directly against the end surfaces of the bearing members $9_1$, $9_2$, $9_3$ and so on. In this manner the axial security of the supporting member 10 relatively to the housing 13 is transmitted to the bearing members $9_1$, $9_2$, $9_3$ and so on and consequently via the sleeve 4 to the axle-journal 1. By inserting tangential cotters or in any other suitable manner, the supporting member 10 may be guaranteed against turning in the axle bearing housing 13, in so far as this guarantee does not already exist on account of the drawing together of the housing halves with the aid of the bolts 14.

The sleeve 4 is reduced conically at its front ends, in order to restrict the lubricant flow to the intermediate race 2. In addition there is arranged on the race 2 a lubricant spraying ring 38 in combination with a labyrinth packing 16 as well as two dust packings 17.

The bearing members $9_1$, $9_2$, $9_3$ and so on are annularly recessed at 18 at the part situated opposite the joint between the supporting member halves $10_1$, $10_2$ in order to reduce frictional surface in the neighbourhood of the joint, the transition to the bearing surfaces proper being gradual, so that the oil film is not disturbed in the bearing surface. The axle bearing housing 13 underneath the bearing member and underneath the supporting member is shaped at 19 as a lubricant storage receptacle. The lubricant collected in the lubricant storage receptacle 19 has access to the bearing members on the one hand through the bore 20 and on the other hand through the recesses 21 in the collars $10_1''$, $10_2''$.

The axle-bearing so described serves to perform the following special and novel lubricating process.

The bearing members $9_1$, $9_2$, $9_5$ rotating with the sleeve 4 and with axle journal become coated with lubricant while passing through the lubricant bath, which by means of the recesses 21 has the possibility of penetrating into the interior of the steel supporting member 10. Moreover the groove-shaped recesses $11_1$, $11_2$, $11_3$ and so on between the bearing members $9_1$, $9_2$, $9_3$ and so on in combination with the wedge-shaped entrance spaces $9_1'$, $9_2'$, $9_3'$ and so on or $9_1''$, $9_2''$, $9_3''$ and so on, according to the direction of rotation at the time, act like the blades or rotors of centrifugal pumps, so that the lubricant is drawn out of the lubricant receptacle 19 via the bore 20 of the supporting member 10 into the storage spaces $11_1$, $11_2$, $11_3$ and consequently into the wedge-shaped entrance spaces. The wedge-shaped entrance spaces consequently become filled with lubricant and there forms between the bearing members and the supporting member the lubricant film, which produces the fluid friction between the bearing members and the supporting member. The new lubricating process moreover guarantees the advantages elucidated in detail in the introduction. In particular the whole surface of the bearing members is now utilized as bearing surface, and consequently the effects of wear in the bearing members of anti-friction metal are reduced considerably. The axle journal itself is no longer subjected to wear, so that the de-assembly and assembly of the wheel-sets and also the machining of the axle-journal is superfluous; by increasing the bearing surfaces the specific bearing-load is reduced, while the cooling surfaces are increased. By correspondingly reducing the frictional forces which occur the lubricating capacity of the lubricant is increased and the effects of wear are reduced, and the bearing members and supporting members, which are subjected to great stresses, can be replaced in the simplest manner.

The invention is not restricted to the use of several bearing members. Fig. 3 shows a form in which one single bearing member 9 is provided. In order to create the wedge-shaped entrance spaces 9' and 9'' the internal diameter of the hollow cylindrical supporting member 10 is greater, by at least the maximum thickness of the oil wedge, than the external diameter of the cylindrical bearing member 9. Otherwise the construction of the axle bearing according to Fig. 3 corresponds perfectly with that according to Figs. 1 and 2.

Figure 5:
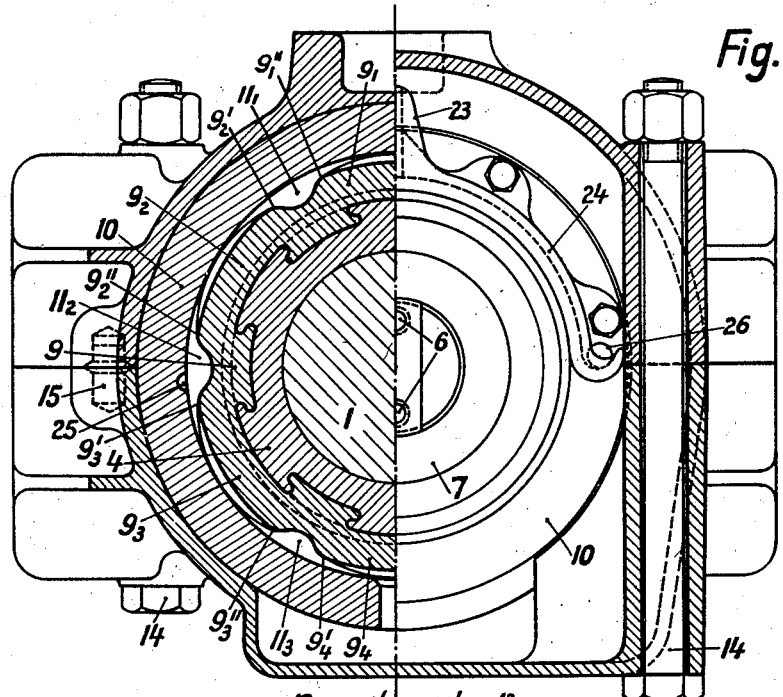
Fig. 5 shows the axle bearing according to Fig. 4 in partial transverse section and in partial front elevation on the axle journal.
Figure 6:
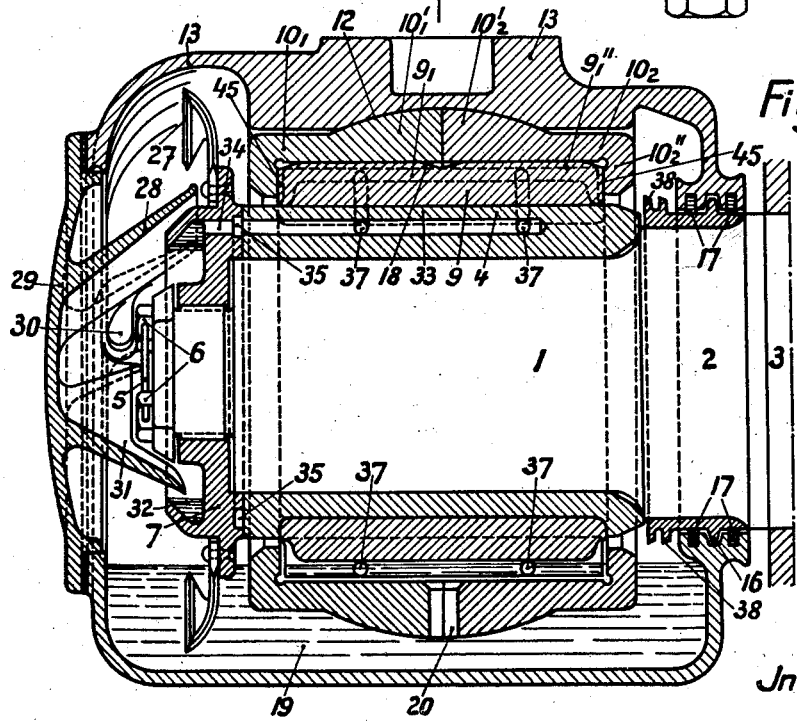
Fig. 6 represents a form according to Fig. 1 with elevation of the oil and introduction of the same with the aid of channel-like recesses in the bearing-member or in the supporting sleeve.
Figure 7:
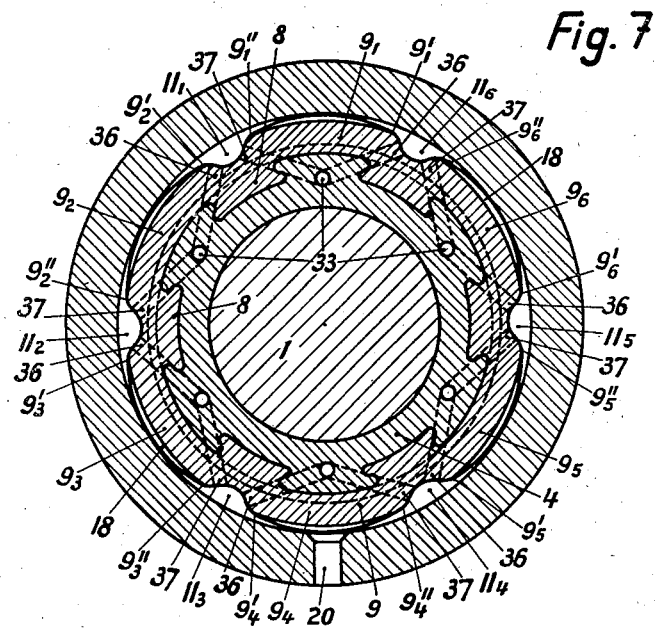

The lubrication of the bearing member or bearing members is in no way confined either to the pumping action or to the purely superficial coating of the member or members with lubricant. In particular the known principle of elevating or raising the lubricant can be applied, in order to introduce quantities of lubricant as large as desired into the wedge-shaped entrance spaces. Fig. 4 shows such an elevation of the lubricant with the aid of an annular fan 22 rotating with the axle-journal 1. In the annular fan there is formed a lubricant ring which is caught by the nose or scoop 23 and conducted into the crescent-shaped channel 24. This channel is fastened, in the manner evident from Fig. 5, on the supporting member 10. The supporting member 10 also possesses groove-shaped recesses 25, which are connected with the channel 24 via the bores 26. When the store-spaces 11₁, 11₂, 11₃ and so on pass by the groove 25, they become filled with lubricant in so far as they have not already been filled with lubricant via bores 20 and through being bathed in any manner whatever. Figs. 6 and 7 show a further form in which the lubricant is introduced into the wedge-shaped entrance spaces under a certain super-pressure. The means for subjecting the lubricant pressure are nevertheless known per se and do not form the subject-matter of the invention. These means consist in the form illustrated by way of example of a member 27 for raising the lubricant, said member being connected fixedly with the axle-journal collar 7 and rotating with the axle journal 1. The lubricant which in part has dripped off and in part has been thrown off centrifugally passes on to the catch-shield 28, which is provided on the cover 29 of the axle bearing housing 13. This catch shield pours the lubricant which has been caught, via channels 30 arranged laterally in the housing, on the spout 31 on the cover 29. The nozzle 31 opens into a receptacle 32 which is formed at the front of the axle-journal 1 by suitably shaping the axle journal collar 7. Under the influence of the rotation of the axle-journal there is formed from the quantity of lubricant introduced a lubricant ring. Longitudinal bores 33 in the sleeve 4 are connected with short transverse bores 34 in the axle journal collar via an annular recess 35 in the same. The transverse bores 34 open into the receptacle 32 in the direct neighbourhood of the maximum diameter of the same. The channels 33 are connected, as Fig. 7 shows, with the storage spaces 11₁, 11₂, 11₃ and so on via each pair of channels 36 and 37 arranged say in the tangential direction.

In the case of the arrangement according to Figs. 6 and 7 the lubricant consequently passes out of the lubricant bath 32 in the first place already under a certain pressure into the channels 33 and thence via the channels 36 and 37 and via the store-spaces 11₁, 11₂, 11₃ and so on into the wedge-shaped entrance spaces, because the lubricant in the receptacle 32 is subjected to the action of centrifugal forces. As soon however as the lubricant flowing under pressure flows out of the longitudinal channels 33 into the tangential channels 36 and 37, it experiences in the direction of rotation an additional shock-like acceleration which drives it with an additional super-pressure via the storage spaces 11₁, 11₂, 11₃ into the running-in channels.

Fig. 8 shows a constructional form in the case of which in addition to the main lubricant bath 19 a subsidiary lubricant bath 39 is provided. In the case of this form there is provided in the lower half of the housing 13 a horizontal ledge 40, on which is mounted the bell-shaped auxiliary storage receptacle 41 for the lubricant. It possesses at its upper end a charging screw 42 and at its lower end a bore 43 open to the main store 19 of the lubricant. Bolts 44 screw the bell-shaped receptacle 41 firmly on the ledge 40—see also the plan of the receptacle drawn in lines formed of dots and dashes. As soon now as the lubricant bath 19 has sunk below the bore 43, the air has access to the bore 43, so that it passes via this into the chamber 39 and expels a corresponding quantity of lubricant. By means of the powerful shock-like stresses to which the axle-bearing is subjected, this operation is facilitated and aided. The auxiliary bath 39 supplements the main bath 19 until the upper surface of the latter lies above the opening 43. After, according to circumstances, the auxiliary bath is used up and the main bath has sunk below a certain pre-determined minimum amount, the main bath is replenished in the ordinary way and at the same time the auxiliary stone receptacle 41 is filled up, the screw 42 being removed for this purpose and the opening 43 being kept closed.

As Figs. 2, 4 and 6 show the ends of the bearing members also possess wedge-shaped entrance spaces so that the formation of oil-wedges in the neck portion of the bearing is brought about just as certainly as in the supporting portion of the bearing.

It is of the essential nature of the invention, the characteristic features of which have been above set forth, that it can be employed not only in the case of axle bearings, particularly axle bearings for rail vehicles, but also for any fixed shaft bearing, for axial thrust bearings, for heavily loaded roller bearings, for transmission bearings and finally also for free wheel bearings and other kinds of bearings.

In all of these bearings, according to the present invention, the rotating member is so constructed that wedges of lubricant are formed between it and the fixed parts of the bearing.

What I claim is:—

1. An axle bearing comprising in combination an axle journal, a bearing brass, recesses which extend substantially equidistant to each other being provided in the surface of the axle body in the longitudinal direction of the axle and adapted to produce on the axle body a number of bearing surfaces, each bearing surface which slopes from a central highest vertex on the entire length of the axle body toward the neighbouring recesses in a peripheral direction being adapted to form in connection with the bearing brass wedge-shaped entrance spaces for each bearing surface, means for introducing lubricant in the recesses and in the wedge-shaped entrance spaces.

2. Axle bearing comprising in combination an axle journal, a bearing brass on the said axle journal, an axle bearing housing, a lubricant supply receptacle underneath the axle journal, recesses which extend substantially equidistant to each other being provided in the surface of the axle body in the longitudinal direction of the axle and adapted to produce on the axle body a number of bearing surfaces, each bearing surface which slopes from a central highest vertex on the entire length of the axle body toward the neighbouring recesses in a peripheral direction being adapted to form in connection with the bearing brass wedge-shaped entrance spaces for each bearing surface, the arrangement of the said lubricant supply relative to the axle body being adapted to immerse the axle body in the lubricant supply whereby lubricant is introduced in the recesses and in the wedge-shaped entrance spaces.

3. An axle bearing comprising in combination an axle journal, a bearing brass on the said axle journal, an axle bearing housing, a lubricant supply receptacle in the said axle bearing housing underneath the axle journal, an annular member on the said axle journal, recesses which extend substantially equidistant to each other being provided in the surface of the said annular member in the longitudinal direction of the axle and adapted to produce on the annular member a number of bearing surfaces, each bearing surface which slopes from a central highest vertex on the entire length of the annular member toward the neighbouring recesses in a peripheral direction being adapted to form in connection with the bearing brass wedge-shaped entrance spaces for each bearing surface, the arrangement of the said lubricant supply relative to the annular member being adapted to immerse the annular member in the lubricant supply whereby lubricant is introduced in the recesses and in the wedge-shaped entrance spaces.

4. An axle bearing comprising in combination an axle journal, an axle bearing housing, a lubricant supply receptacle in the said axle bearing housing underneath the axle journal, an annular member on the said axle journal, an annular stationary bearing brass around the said annular member, recesses which extend substantially equidistant to each other being provided in the surface of the annular member in the longitudinal direction of the axle and adapted to produce on the annular member a number of bearing surfaces, each bearing surface sloping from a central highest vertex on the entire length of the annular member toward the neighbouring recesses in a peripheral direction, the said arrangement being adapted to form in connection with the annular bearing brass wedge-shaped entrance spaces for each bearing surface, recesses in the lower vertex of said bearing brass adapted to lead lubricant from the lubricant supply receptacle into the recesses and into the wedge-shaped entrance spaces.

5. An axle bearing comprising in combination an axle journal, an axle bearing housing, a lubricant supply receptacle in the said axle bearing housing underneath the axle journal, an annular stationary bearing brass around the said annular member, recesses which extend substantially equidistant in the surface of the annular member in the longitudinal direction of the axle being adapted to produce on the annular member a number of bearing surfaces, each bearing surface sloping from a central highest vertex on the entire length of the annular member toward the neighbouring recesses in a peripheral direction, and arrangement being adapted to form in connection with the annular bearing brass wedge-shaped entrance spaces for each bearing surface, recesses in the lower vertex of said bearing brass adapted to lead lubricant from the lubricant supply receptacle into the recesses and into the wedge-shaped entrance spaces, means independent of the immersion lubrication of the annular member for introducing lubricant into the lubricant-storing recesses between two wedge-shaped entrance spaces.

6. Axle bearing according to claim 3, the said annular member comprising an inner bushing rigidly secured to the axle journal end and an outer annular bearing member of anti-friction metals, said bearing brass consisting of steel.

VICTOR ALEXANDER BARY.